(12) United States Patent
Caldwell et al.

(10) Patent No.: US 9,082,460 B2
(45) Date of Patent: Jul. 14, 2015

(54) DRIVE ENCLOSURE WITH GRIPPING PADS

(75) Inventors: Barry E. Caldwell, Colorado Springs, CO (US); Jeffrey D. Wilke, Palmer Lake, CO (US)

(73) Assignee: Jabil Circuit, Inc., St. Petersburg, FL (US)

( * ) Notice: Subject to any disclaimer, the term of this patent is extended or adjusted under 35 U.S.C. 154(b) by 327 days.

(21) Appl. No.: 13/529,034

(22) Filed: Jun. 21, 2012

(65) Prior Publication Data
US 2012/0327595 A1 Dec. 27, 2012

Related U.S. Application Data

(60) Provisional application No. 61/499,744, filed on Jun. 22, 2011.

(51) Int. Cl.
| H05K 5/00 | (2006.01) |
| H05K 7/00 | (2006.01) |
| G06F 1/16 | (2006.01) |
| G11B 33/08 | (2006.01) |
| G06F 1/18 | (2006.01) |

(52) U.S. Cl.
CPC . *G11B 33/08* (2013.01); *G06F 1/18* (2013.01); *G06F 1/181* (2013.01)

(58) Field of Classification Search
CPC .................................. G06F 1/18; G06F 1/181
USPC ........................................ 361/679.33–679.39
See application file for complete search history.

(56) References Cited

U.S. PATENT DOCUMENTS

| 8,223,482 B2 * | 7/2012 | Tan et al. ................. 361/679.34 |
| 8,467,180 B2 * | 6/2013 | Merrow et al. .......... 361/679.34 |
| 2002/0044416 A1 * | 4/2002 | Harmon et al. ............... 361/685 |
| 2004/0179333 A1 * | 9/2004 | Xu ................................. 361/685 |
| 2006/0181845 A1 * | 8/2006 | Shah et al. .................... 361/685 |
| 2009/0153994 A1 * | 6/2009 | Merrow et al. ................. 360/31 |
| 2010/0195236 A1 * | 8/2010 | Merrow et al. ................. 360/31 |
| 2011/0051356 A1 * | 3/2011 | Yang et al. ............... 361/679.39 |

* cited by examiner

*Primary Examiner* — Anthony Haughton
(74) *Attorney, Agent, or Firm* — Volpe and Koenig, P.C.

(57) ABSTRACT

Improved electronic device protection enclosures are generally described. In an example, an illustrative apparatus for protecting an electronic device is provided. The apparatus includes a drive enclosure structure, a gripping pad, and a deformation mechanism. The drive enclosure structure includes a sidewall. The gripping pad is located on the sidewall and includes a plurality of angled slots. The deformation mechanism is connected to the sidewall and configured to facilitate selective deformation of the gripping pad.

21 Claims, 6 Drawing Sheets

DRIVE ENCLOSURE WITH GRIPPING PADS

CROSS-REFERENCE TO RELATED APPLICATIONS

The present application claims the benefit of U.S. Provisional Patent Application No. 61/499,744, filed on Jun. 22, 2011, which is incorporated herein by reference in its entirety.

BACKGROUND

The following description is provided to assist the understanding of the reader. None of the information provided or references cited is admitted to be prior art.

Information storage devices, e.g., hard disk drive (HDD) mechanisms and solid-state drive (SSD) mechanisms, are sensitive to vibration and mechanical shock. During operation, HDDs generate and create vibration as they rotate. By definition, a hard drive system will undergo rotational vibration when an oscillating moment is applied. As HDD technology progresses to faster rotational speeds and cost-reduction architectures, these vibration problems are exacerbated. In addition to the drive-induced vibration, there is also the possibility of vibration being induced externally by the environment in which the drives are located. Vibration can also come in the form of acoustic vibration. For example, the drives can produce disturbing acoustic noise, particularly for consumer product applications. Excessive vibration may lead to decreased drive performance. Excessive vibration or shock may also cause irreparable drive failures. In addition, when such drives are incorporated into a removable cartridge, the drive may be easily dropped and damaged when the cartridge is removed or transported.

To prevent excessive vibration and mechanical shock an enclosure may be used to protect the drive. Such an enclosure may be formed around the respective drive. Traditional enclosures have been formed of rigid metallic materials that lack elasticity and are relatively expensive.

SUMMARY

The present technology provides an illustrative apparatus for protecting an electronic device according to a first embodiment. The apparatus includes a drive enclosure structure, a gripping pad, and a deformation mechanism. The drive enclosure structure includes a sidewall. The gripping pad is located on the sidewall and includes a plurality of angled slots. The deformation mechanism is connected to the sidewall and configured to facilitate selective deformation of the gripping pad.

The present technology further provides an illustrative apparatus for protecting an electronic device according to a second embodiment. The apparatus includes means for at least partially enclosing the electronic device. The means for at least partially enclosing the electronic device include a sidewall. The apparatus further includes means for gripping a wall of a retaining slot. The means for gripping the wall of the retaining slot are formed on the sidewall and comprise a plurality of angled slots. The apparatus also includes means for facilitating selective deformation of the gripping pad.

The present technology also provides an illustrative apparatus for protecting an electronic device according to a third embodiment. The apparatus includes a drive enclosure structure having a sidewall, a first end portion, and a second end portion opposite the first end portion. The apparatus also includes a gripping pad located on the sidewall and that comprises a plurality of angled slots. The apparatus further includes a handle connected to a slotted portion of the sidewall and positioned about the first end portion. The handle is configured to facilitate selective deformation of the gripping pad.

The foregoing summary is illustrative only and is not intended to be in any way limiting. In addition to the illustrative aspects, embodiments, and features described above, further aspects, embodiments, and features will become apparent by reference to the following drawings and the detailed description.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

Figure 1:
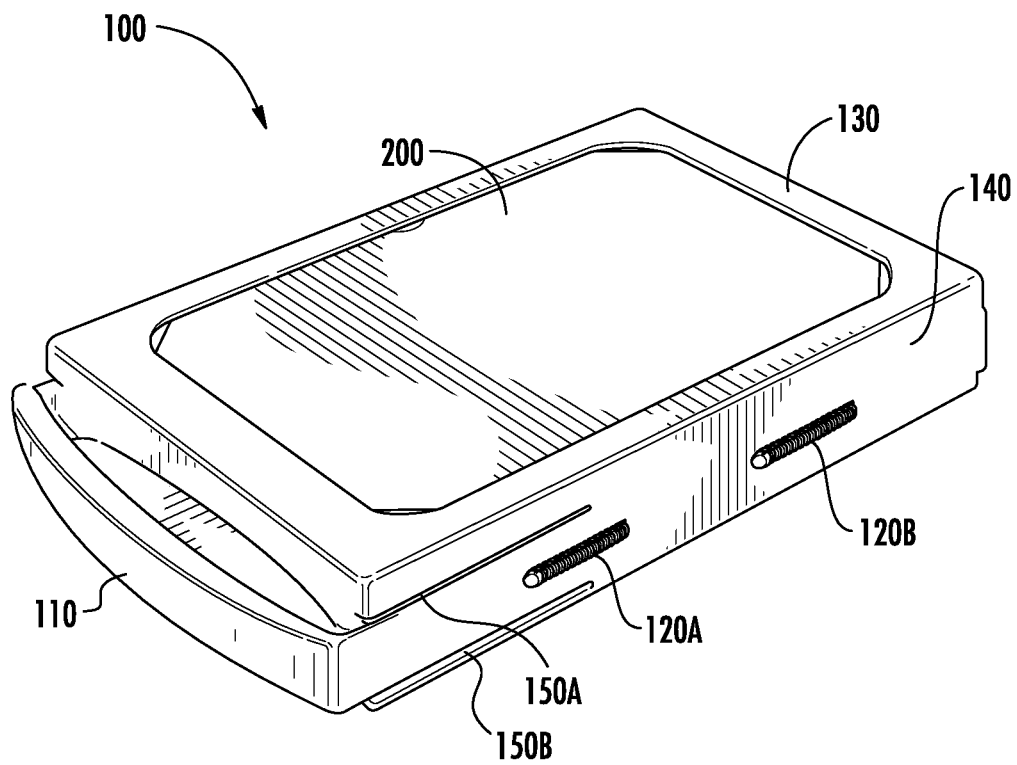
FIG. 1 depicts a first view of a drive enclosure in accordance with an illustrative embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

Protective enclosures may be used to prevent excessive vibration and mechanical shock experienced by an information storage drive, e.g., a hard disk drive, a solid-state drive, or any other information storage drive known to those of skill in the art. Such a protective enclosure may be formed around the respective information storage drive. Described herein are illustrative improved drive enclosure technologies which increase the protection provided to a respective enclosed information storage drive while reducing the cost of such protective enclosures.

FIG. 1 depicts a first view of a drive enclosure 100 in accordance with an illustrative embodiment. Drive enclosure 100 is formed around an information storage device/drive 200. Information storage drive 200 may include a hard disk drive (HDD), a solid-state drive (SDD), or any other information storage drive known to those of skill in the art. Drive enclosure 100 includes a deformation mechanism 110 such as a handle and gripping pads 120A and 120B. In an embodiment, drive enclosure 100, gripping pads 120A and 120B, and handle are all integrally formed together in a one-piece construction made from a semi-rigid elastomeric material. The semi-rigid elastomeric material may include any suitable material known to those of skill in the art. Examples of such material include silicon, rubber, plastic, or other elastomeric materials. The entire drive enclosure 100 may include such an elastomeric material, or only portions of drive enclosure 100 may include elastomeric material. In an embodiment, the elastomeric material may have electrically and/or thermally conductive materials embedded therein to increase the electrical and/or thermal conductivity of drive enclosure 100. Such characteristics are advantageous for aiding in electrostatic discharge protection and heat removal and reducing electromagnetic interference. The electrically and/or thermally conductive materials may include any suitable material known to those of skill in the art. Examples of such materials include silver, copper, gold, and carbon fiber. In an alternative embodiment, drive enclosure 100 may be made of any suitable material known to those of skill in the art. For example, drive enclosure 100 may include metal, rigid plastic, or any other suitable material.

In an embodiment, drive enclosure 100 includes a lid 130 that is configured to be pulled around and over information storage drive 200 such that lid 130 securely holds information storage drive 200 within drive enclosure 100. In an embodiment, drive enclosure 100 may be configured to wrap around information storage drive 200 such that each of the sides of information storage drive 200 are at least partially covered by drive enclosure 100. In an embodiment, lid 130 includes edges that lap over information storage drive 200 when information storage drive 200 is inserted into drive enclosure 100. The edges of lid 130 hold information storage drive 200 securely in place within drive enclosure 100. In an embodiment, the elasticity of the elastomeric material of drive enclosure 100 allows the edges of lid 130 to be pulled back such that information storage drive 200 may be selectively inserted and/or removed from drive enclosure 100.

Drive enclosure 100 further includes gripping pads 120A and 120B formed on a side rail 140. Gripping pads 120A and 120B are configured to retain, via a reverse gripping action, information storage drive 200 within a drive slot of an electronic component to which information storage drive 200 may be electrically connected. In addition, gripping pads 120A and 120B may improve shock dampening by cushioning the vibration of information storage drive 200 against the drive slot of an electronic component to which information storage drive 200 is connected. In an embodiment, additional gripping pads are located on the side rail opposite side rail 140.

In an embodiment, gripping pads 120A and 120B comprise a semi-rigid elastomeric material similar to that which may be used for drive enclosure 100. Such materials may include silicon, rubber, plastic, or other elastomeric materials. In an alternative embodiment, drive enclosure 100 may be made of a different material than gripping pads 120A and 120B.

As mentioned above, drive enclosure 100 also includes a deformation mechanism 110 that is configured to selectively deform gripping pads 120A and/or 120B. In an embodiment, deformation mechanism 110 includes one or more handles. In an alternative embodiment, deformation mechanism 110 may include a separate tool that may be applied to gripping pads 120A and 120B. In another alternative embodiment deformation mechanism 110 may include any mechanical structure connected to gripping pads 120A and 120B and capable of causing selective deformation of gripping pads 120A and 120B.

In an embodiment, deformation mechanism 110 is connected to side rail 140. Deformation mechanism 110 may also be connected to another side rail opposite side rail 140. Slots 150A and 150B are formed between deformation mechanism 110 and at least a portion of side rail 140. Upon application of a force to deformation mechanism 110, slots 150A and 150B allow for deformation of at least a portion of side rail 140 and of gripping pads 120A and 120B. In an embodiment, the application of force includes a pulling force on deformation mechanism 110. Deformation of gripping pads 120A and 120B may reduce the height of gripping pads 120A and 120B, thus facilitating extraction of information storage drive 200 from a corresponding drive or packaging slot of an electronic component to which the information storage drive 200 may be connected.

Figure 2:
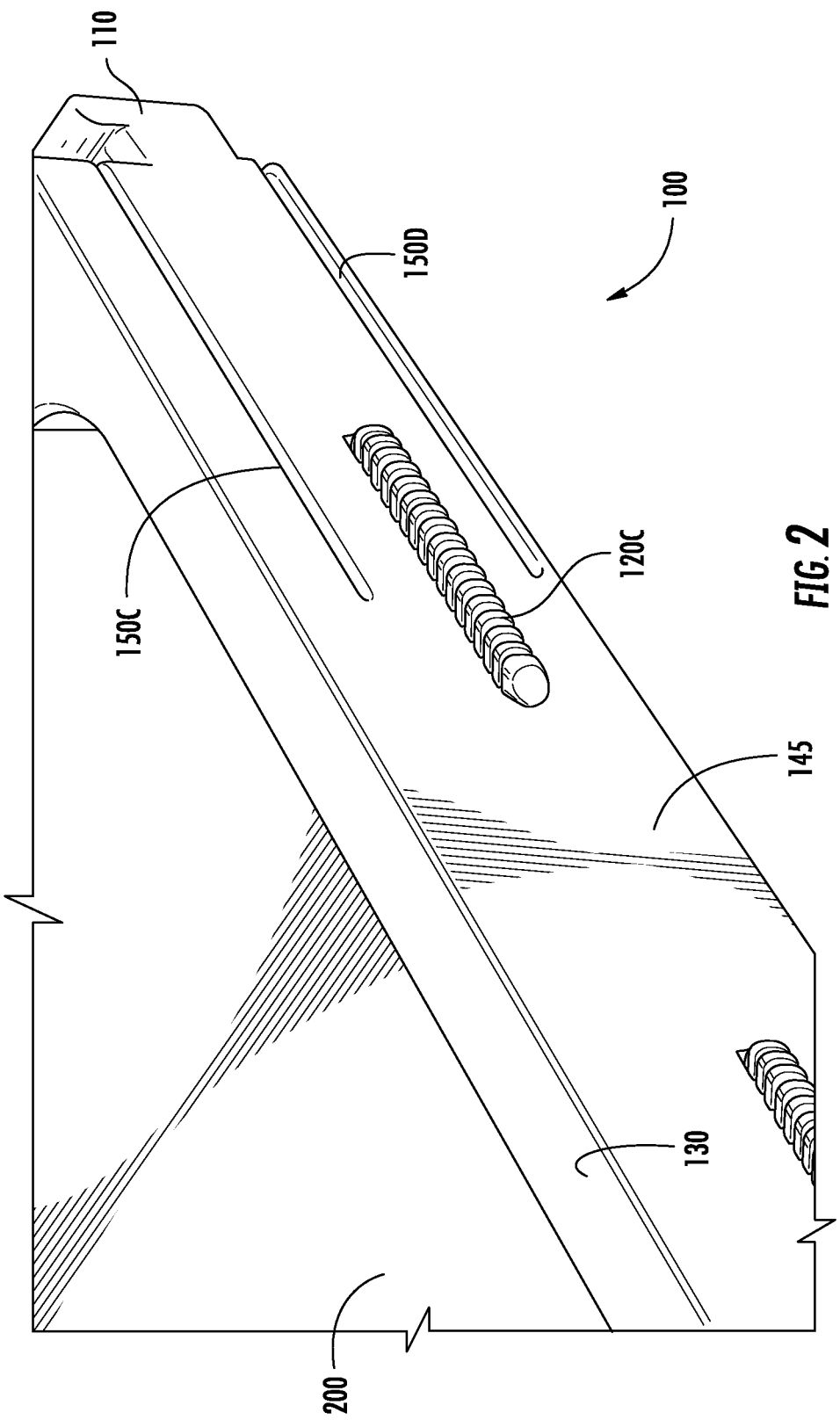
FIG. 2 depicts a second view of a drive enclosure from an opposite side as depicted in FIG. 1 in accordance with an illustrative embodiment.

FIG. 2 depicts a second view of drive enclosure 100 from an opposite side as depicted in FIG. 1 in accordance with an illustrative embodiment. Drive enclosure 100 further includes a gripping pad 120C located on a side rail 145. Deformation mechanism 110 is connected to side rail 145. In an embodiment, side rail 145 is formed on an opposite side of drive enclosure 100 as side rail 140 from FIG. 1. Slots 150C and 150D are formed between deformation mechanism 110 and at least a portion of side rail 145. Upon application of a force to deformation mechanism 110, slots 150C and 150D allow for deformation of gripping pad 120C.

Figure 3:
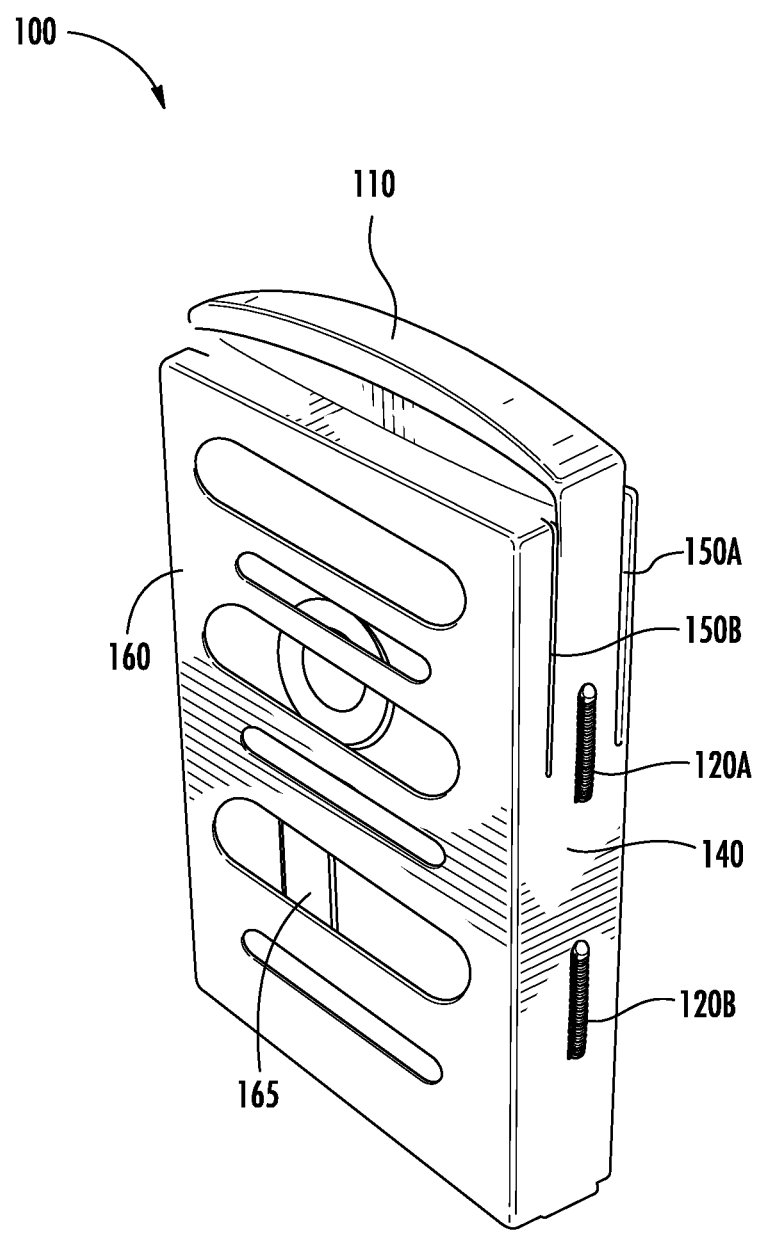
FIG. 3 depicts a third view of a drive enclosure in accordance with an illustrative embodiment.

FIG. 3 depicts a third view of drive enclosure 100 in accordance with an illustrative embodiment. Drive enclosure 100 further includes a bottom portion 160. In an embodiment, bottom portion has a plurality of openings 165. Openings 165 may facilitate the movement of air to and away from an information storage drive enclosed within drive enclosure 100. Openings 165 may have any desired shape and/or size. For example, openings 165 may be ovals, rectangles, circles, etc. In an alternative embodiment, bottom portion may have no openings and the bottom portion of drive enclosure 100 may consist of an integral unified membrane.

Drive enclosure 100 of FIG. 3 further includes gripping pads 120A and 120B located on side rail 140. Deformation mechanism 110 is connected to side rail 140. Slots 150A and 150B are formed between deformation mechanism 110 and at least a portion of side rail 140 and allow for deformation of gripping pads 120A and 120B upon application of a force to deformation mechanism 110.

Figure 4:
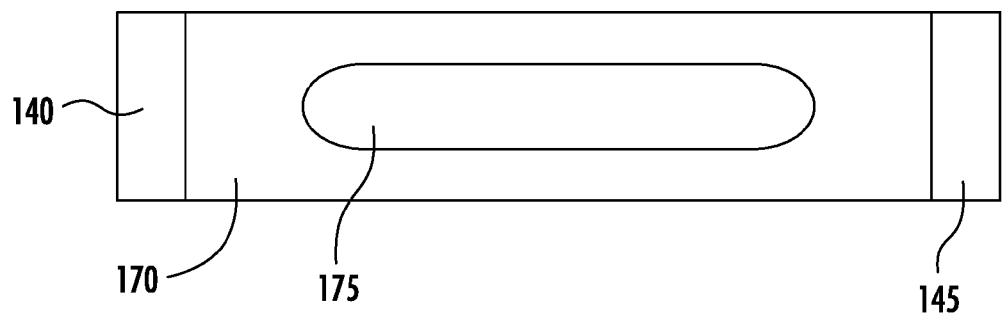
FIG. 4 depicts an end view of a drive enclosure in accordance with an illustrative embodiment.

FIG. 4 depicts an end view of drive enclosure 100 in accordance with an illustrative embodiment. Drive enclosure 100 further includes a connection end side rail 170. Connection end side rail 170 includes an opening 175 that is configured to accommodate an electrical connection of an information storage drive contained within drive enclosure 100. In an embodiment, the electrical connection may include any electrical connector known to those of skill in the art. Drive enclosure 100 further includes side rail 140 and side rail 145 connected to connection end side rail 170. As discussed above, respective gripping pads may be formed one or both of side rail 140 and side rail 145.

Figure 5:
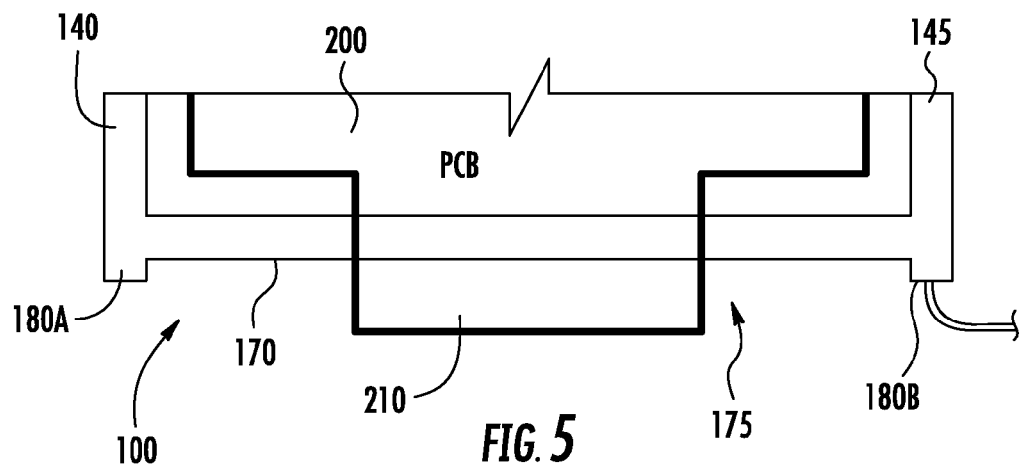
FIG. 5 depicts a top view of a connection end of a drive enclosure in accordance with an illustrative embodiment.

FIG. 5 depicts a top view of a connection end of drive enclosure 100 in accordance with an illustrative embodiment. In FIG. 5, information storage drive 200 is contained within drive enclosure 100. Information storage drive 200 includes an electrical connector 210 that protrudes from information storage drive 200 and through opening 175 within connection end side rail 170 of drive enclosure 100. Drive enclosure 100 further includes side rails 140 and 145.

In an embodiment, connection end side rail 170 is thinner than side rails 140 and 145 such that bumpers may be formed on connection end side rail 170. In an example embodiment, drive enclosure 100 includes bumper pads 180A and 180B formed over the corners of connection end side rail 170 of drive enclosure 100. Bumper pads 180A and 180B allow for increased shock absorption between information storage drive 200/drive enclosure 100 and the back of the drive slot or packaging slot of an electronic component in which information storage drive 200/drive enclosure 100 is inserted.

Figure 6:
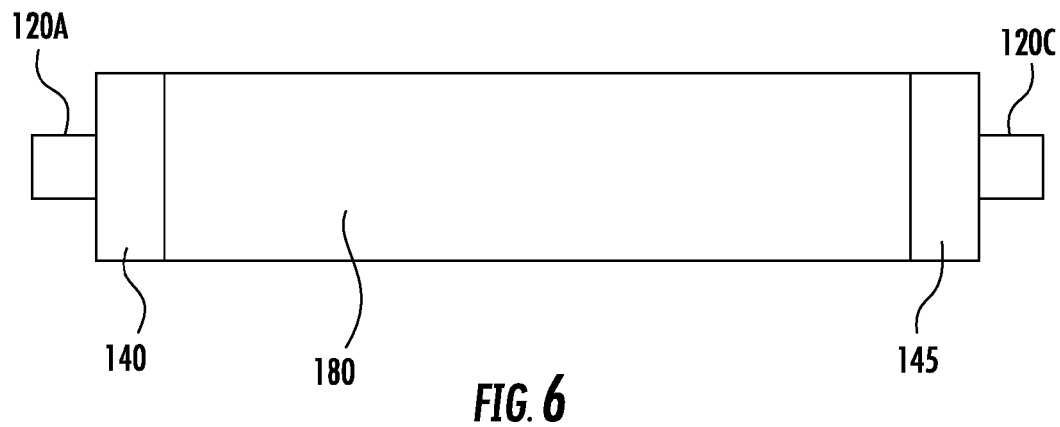
FIG. 6 depicts an end view of a non-connection end of a drive enclosure in accordance with an illustrative embodiment.

FIG. 6 depicts an end view of a non-connection end of drive enclosure 100 in accordance with an illustrative embodiment. Drive enclosure 100 includes a non-connection end side rail 180. Non-connection end side rail 180 is connected to side rails 140 and 145 at respective corners. As discussed above, side rails 140 and 145 may include gripping pads 120A and 120C formed thereon, respectively. In an embodiment, non-connection end side rail 180 is constructed from a semi-rigid material that allows selective deformation and extension of side rails 140 and 145 to facilitate eased removal of drive enclosure 100/information storage drive 200 from a drive slot or packaging slot of an electronic component to which the information storage drive 200 is connected. In an embodiment, non-connection end side rail 180 includes a handle as discussed above to facilitate selective deformation of side rails 140 and 145 and their respective gripping pads 120A and 120C.

Figure 7:
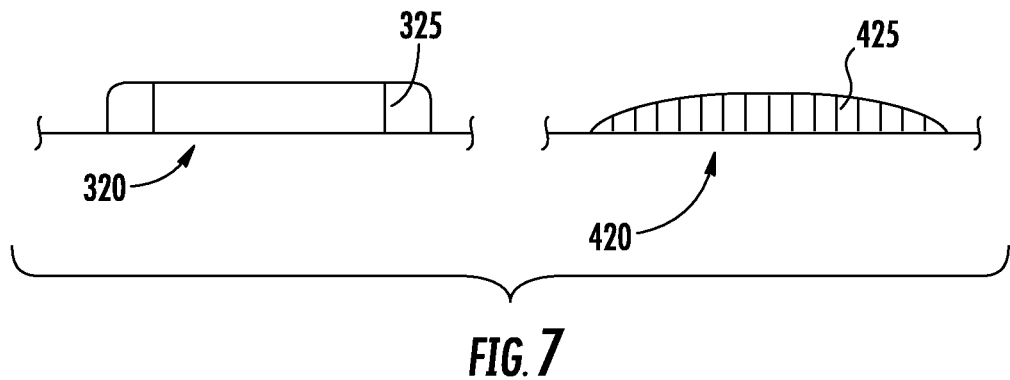
FIG. 7 depicts a side elevation view of respective gripping pads in accordance with an illustrative embodiment.

FIG. 7 depicts a side elevation view of a gripping pad 320 and a gripping pad 420 in accordance with an illustrative embodiment. Gripping pad 320 includes vertical, angular edges. Gripping pad 320 further includes a plurality of slots 325 that are formed at least a portion of the way through gripping pad 320. Gripping pad 420 includes rounded or beveled edges. Gripping pad 420 further includes a plurality of slots 425 that are formed at least a portion of the way through gripping pad 420.

Slots 325 and 425 create a reverse gripping action for gripping pad 320 and gripping pad 420, respectively. Slots 325 and 425 are angled from the top/outermost portion of gripping pads 320 and 420, respectively, toward the direction of insertion of the information storage drive into a drive slot or packaging slot of an electronic component to which the information storage drive is to be connected. Slots 325 and 425 enhance retention of the drive within a drive slot or packaging slot via a reverse gripping action. When the drive is inserted into the drive slot or packaging slot, slots 325 and 425 will be easily pushed away from the direction of insertion due to the angling of slots 325 and 425 from the top/outermost portion of gripping pads 320 and 420, respectively, toward the direction of insertion of the information storage drive, thus decreasing the overall height of gripping pads 320 and 420. In contrast, if the drive receives a force pushing the information storage drive out of the drive slot or the packaging slot, the angling of slots 325 and 425 will prevent movement of the information storage drive by increasing the overall height of gripping pads 320 and 420, respectively.

Figure 8:
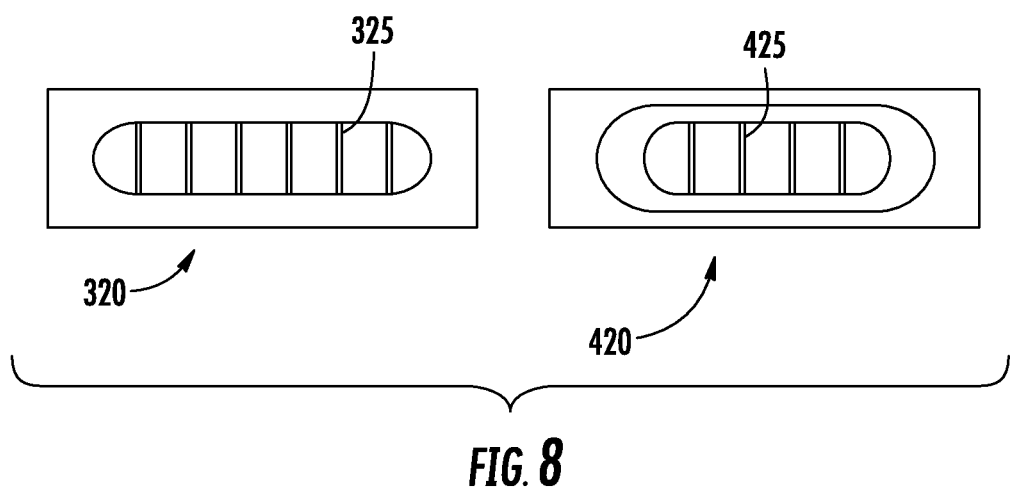
FIG. 8 depicts a top view of respective gripping pads in accordance with an illustrative embodiment.

FIG. 8 depicts a top view of gripping pad 320 and gripping pad 420 in accordance with an illustrative embodiment. Gripping pad 320 includes a plurality of slots 325 that are formed at least a portion of the way through gripping pad 320, and gripping pad 420 includes a plurality of slots 425 that are formed at least a portion of the way through gripping pad 420. Gripping pads 320 and 420 each have a generally oval shape. However, in alternative embodiments, gripping pads 320 and 420 may have any desired shape. The shapes of gripping pads 320 and 420 may be configured to facilitate selective insertion and removal of the drive enclosure structure from a retention slot or space. For example, gripping pads 320 and 420 may have a rectangular shape, a square shape, a circular shape, or any other shape known to those of skill in the art. In addition, gripping pad 420 includes a beveled edge to further facilitate insertion and/or removal of drive enclosure 100/information storage drive 200 into a drive slot or packaging slot.

Figure 9A:
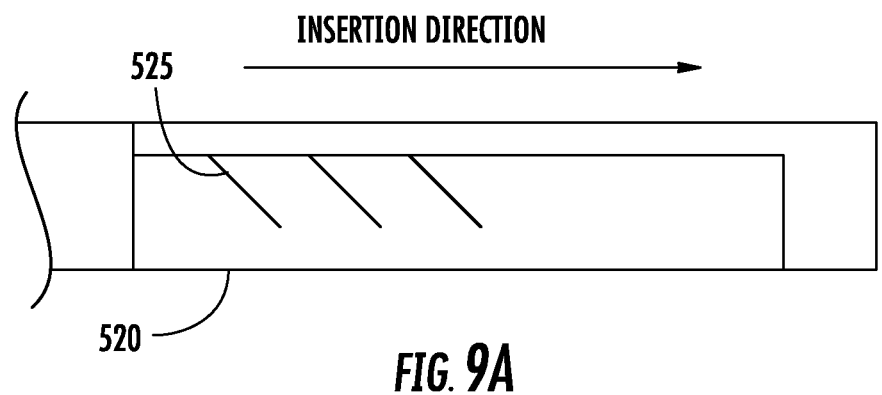
FIG. 9A depicts a gripping pad during insertion of an information storage drive/drive enclosure into a drive slot or packaging slot in accordance with an illustrative embodiment.

FIG. 9A depicts a gripping pad 520 during insertion of an information storage drive/drive enclosure into a drive slot or packaging slot of an electronic component in accordance with an illustrative embodiment. Gripping pad 520 includes a plurality of slots 525. Slots 525 are angled from the top/outermost portion of gripping pad 520 toward the direction of insertion of the information storage drive into a drive slot or packaging slot of an electronic component to which the information storage drive is to be connected. When the information storage drive is inserted into the drive slot or packaging slot, slots 525 may slide against a wall of the drive slot or packaging slot. Upon sliding against such a wall, slots 525 will be easily pushed away from the direction of insertion due to the angling of slots 525 from the top/outermost portion of gripping pad 520 toward the direction of insertion of the information storage drive, thus decreasing the overall height of gripping pad 520. In this way, gripping pad 520 and slots 525 allow for eased insertion of the information storage drive/drive enclosure into a drive slot or packaging slot of the electronic component.

Figure 9B:
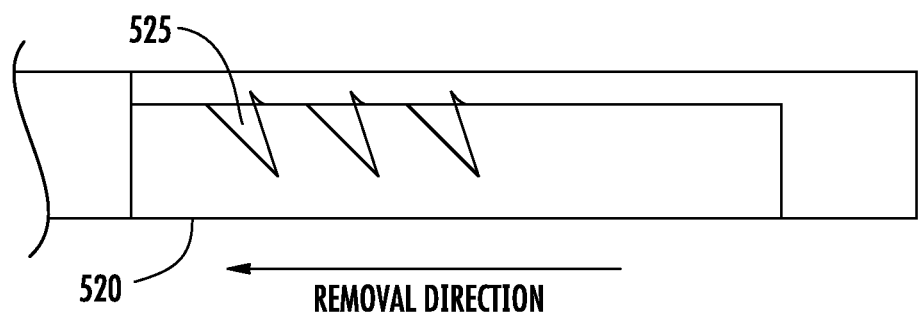
FIG. 9B depicts a gripping pad during removal of an information storage drive/drive enclosure from a drive slot or packaging slot in accordance with an illustrative embodiment.

FIG. 9B depicts gripping pad 520 during removal of an information storage drive/drive enclosure from a drive slot or packaging slot of an electronic component in accordance with an illustrative embodiment. Slots 525 are angled from the top/outermost portion of gripping pad 520 away from the direction of removal of the information storage drive from a drive slot or packaging slot of the electronic component. Slots 525 enhance retention of the information storage drive/drive enclosure within a drive slot or packaging slot of the electronic component. Upon receiving a force that causes gripping pad 520 to slide along the wall of the drive slot or packaging slot in the removal direction, slots 525 will pull away from each other, thereby increasing the overall height of gripping pads 525. In this way, the angling of slots 525 will prevent movement of the information storage drive out of the drive slot or packaging slot by increasing the overall height of gripping pads 525. The increased height of gripping pads 525 may cause gripping pads 525 to press against a side wall of a drive slot or packaging slot of an electronic component into which the information drive slot has been inserted, thus preventing movement of the information storage drive/drive enclosure out of the drive slot or packaging slot. In this way, a latching mechanism is not required to retain the information storage drive within the drive slot or packaging slot.

The number and size (both depth and width) of slots 525 directly correlates to the force required to remove the drive enclosure from the drive slot or packaging slot. Accordingly, the greater the quantity and/or size of slots 525, the more force that is required to remove the drive enclosure from the drive slot or packaging slot. The quantity and size of slots 525 may be modified as desired in order to obtain the desired retention force of the drive enclosure. In addition, the greater the quantity and/or size of gripping pads 520, the more force that is required to remove the drive enclosure from the drive slot or packaging slot. Accordingly, the quantity and size of gripping pads 520 may also be modified as desired in order to obtain the desired retention force of the drive enclosure.

The herein described subject matter sometimes illustrates different components contained within, or connected with, different other components. It is to be understood that such depicted architectures are merely illustrative, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the invention be defined by the claims appended hereto and their equivalents.

What is claimed is:

1. An apparatus for protecting an electronic device, the apparatus comprising:
    a drive enclosure structure comprising a sidewall;
    a gripping pad located on the sidewall; and
    a deformation mechanism configured to facilitate selective deformation of a portion of the sidewall and the gripping pad,
wherein the gripping pad comprises a plurality of angled slots with the slots angled from an outermost portion of the gripping pad in an insertion direction of the apparatus.

2. The apparatus of claim 1, wherein the drive enclosure structure comprises an end portion that includes an opening configured to receive an electrical connector of an electronic device.

3. The apparatus of claim 1, wherein the gripping pad comprises an innermost portion physically touching the sidewall and the outermost portion is opposite the innermost portion, and wherein plurality of angled slots are angled from the outermost portion of the gripping pad toward an end portion of the drive enclosure structure.

4. The apparatus of claim 1, wherein the deformation mechanism is connected to a slotted portion of the side wall.

5. The apparatus of claim 1, further comprising a bumper pad located over a corner of the drive enclosure structure at a junction of the sidewall and an end portion of the drive enclosure structure.

6. The apparatus of claim 1, further comprising a lid structure extending substantially perpendicularly from the sidewall and first end portion, and wherein the lid structure extends only partially between the sidewall and a second sidewall and only partially between the first end portion and a second end portion of the drive enclosure structure.

7. The apparatus of claim 1, wherein the drive enclosure structure comprises an elastomeric material.

8. The apparatus of claim 7, wherein the elastomeric material comprises silicon embedded with at least one of silver or carbon fiber.

9. The apparatus of claim 1, wherein the drive enclosure structure further comprises a second sidewall opposite the sidewall and a second gripping pad formed on the second sidewall.

10. The apparatus of claim 1, wherein the drive enclosure structure further comprises a bottom portion including a plurality of air passage slots.

11. The apparatus of claim 1, wherein the deformation mechanism comprises a handle positioned about a first end portion and connected to the sidewall.

12. The apparatus of claim 1, wherein the gripping pad is located on an outermost portion of the sidewall.

13. An apparatus for protecting an electronic device, the apparatus comprising: means for at least partially enclosing the electronic device, wherein the means for at least partially enclosing the electronic device comprise a sidewall; means for gripping a wall of a retaining slot, wherein the means for gripping a wall of the retaining slot are formed on the sidewall and comprise a plurality of slots angled from an outermost portion of the means in an insertion direction of the apparatus; and means for facilitating selective deformation of a portion of the sidewall and the means for gripping a wall.

14. The apparatus of claim 13, wherein an end portion of the means for at least partially enclosing the electronic device comprises an opening configured to receive an electrical connector of the electronic device.

15. The apparatus of claim 13, wherein the means for gripping a wall of a retaining slot comprises an innermost portion physically touching the sidewall and the outermost portion is opposite the innermost portion, and wherein a plurality of angled slots is angled from the outermost portion of the means for gripping a wall of a retaining slot toward an end portion of the means for at least partially enclosing the electronic device.

16. The apparatus of claim 13, further comprising a means for cushioning the electronic drive formed over a corner of the means for at least partially enclosing the electronic device at a junction of the sidewall and an end portion of the means for at least partially enclosing the electronic device.

17. The apparatus of claim 13, wherein the means for at least partially enclosing the electronic device comprises an elastomeric material.

18. The apparatus of claim 13, wherein the means for at least partially enclosing the electronic device further comprises a bottom portion including a means for facilitating air passage from the electronic device.

19. An apparatus for information storage, the apparatus comprising: an enclosure structure for an information storage device comprising: a sidewall; a first end portion; and a second end portion opposite the first end portion; a gripping pad located on the sidewall, wherein the gripping pad comprises a plurality of slots angled from an outermost portion of the gripping pad in an insertion direction of the apparatus; and a handle connected to the sidewall and positioned about the first end portion, wherein the handle is configured to facilitate selective deformation of a portion of the sidewall and the gripping pad.

20. The apparatus of claim 19, wherein the gripping pad and enclosure structure have a one-piece construction integrally formed from an elastomeric material.

21. The apparatus of claim 20, further comprising an information storage device at least partially enclosed within the enclosure structure.

* * * * *

UNITED STATES PATENT AND TRADEMARK OFFICE
CERTIFICATE OF CORRECTION

| | | |
|---|---|---|
| PATENT NO. | : 9,082,460 B2 | Page 1 of 1 |
| APPLICATION NO. | : 13/529034 | |
| DATED | : July 14, 2015 | |
| INVENTOR(S) | : Caldwell et al. | |

It is certified that error appears in the above-identified patent and that said Letters Patent is hereby corrected as shown below:

In the claims

Claim 16, column 10, line 5, after the word "electronic", delete "drive" and insert therefor --device--.

Signed and Sealed this
First Day of December, 2015

Michelle K. Lee
*Director of the United States Patent and Trademark Office*